United States Patent

[11] 3,582,964

[72] Inventors Emil L. Torick
Darien, Conn.;
Richard G. Allen, Pound Ridge, N.Y.;
Benjamin B. Bauer; Allan J. Rosenheck,
Stamford, Conn.
[21] Appl. No. 763,897
[22] Filed Sept. 30, 1968
[45] Patented June 1, 1971
[73] Assignee Columbia Broadcasting System, Inc.
New York, N.Y.

[54] AUTOMATIC LOUDNESS CONTROLLER
8 Claims, 4 Drawing Figs.

[52] U.S. Cl. 179/1
[51] Int. Cl. H03g 3/24
[50] Field of Search 179/1 VOL, 1 F, 1 VC; 325/397, 399, 400, 403, 408; 330/138

[56] References Cited
UNITED STATES PATENTS

| | | | |
|---|---|---|---|
| 1,862,458 | 6/1932 | Barstow | 181/0.5(B) |
| 2,177,050 | 10/1939 | Bartels | 179/1(VOL) |
| 2,892,891 | 6/1959 | Manley et al. | 179/1(VOL) |
| 3,031,528 | 4/1962 | Bolston | 181/0.5(B) |
| 3,187,268 | 6/1965 | Bauer et al. | 179/1(VOL) |

*Primary Examiner*—Kathleen H. Claffy
*Assistant Examiner*—Jon Bradford Leaheey
*Attorney*—Brumbaugh, Graves, Donohue & Raymond ABSTRACT: In the particular embodiment of the invention described herein, program signals are supplied to a unity gain amplifier. An analysis of program loudness is made by equalizing the signals in accordance with a selected ear sensitivity response characteristic. A plurality of band-pass filters divide the equalized signals and the divided signals are first rectified and then combined linearly by a combining network. The combined signal is then supplied to a ballistics shaping network which simulates the ballistic characteristic of the human ear. The resulting control signal is then supplied to a variable gain stage of the unity gain amplifier to vary the gain of the amplifier to control thereby the loudness level of the program material.

INVENTORS
BENJAMIN B. BAUER,
EMIL L. TORICK,
RICHARD G. ALLEN &
BY ALLAN J. ROSENHECK
Brumbaugh, Graves, Donohue & Raymond
their ATTORNEYS

| Selection | Relative Loudness Level (dB) |
|---|---|
| Fanfare | +3 |
| "When you have a headache..." (male speech) | +2 |
| NAB Test Tape (uncompressed male speech) | 0 |
| Pizzicato strings | -3 |
| Brass section | +3 |
| Newscast (uncompressed male speech) | 0 |
| "Hey Lou..." (male speech) | +2 |
| "All I ask..." (female speech) | -2 |
| "Hello..." (low key commercial) | -2 |
| "Imagine browsing..." (low key commercial) | -3 |
| Spinning tires | +3 |
| "Darling..." (female voice) | -1 |

FIG. 2

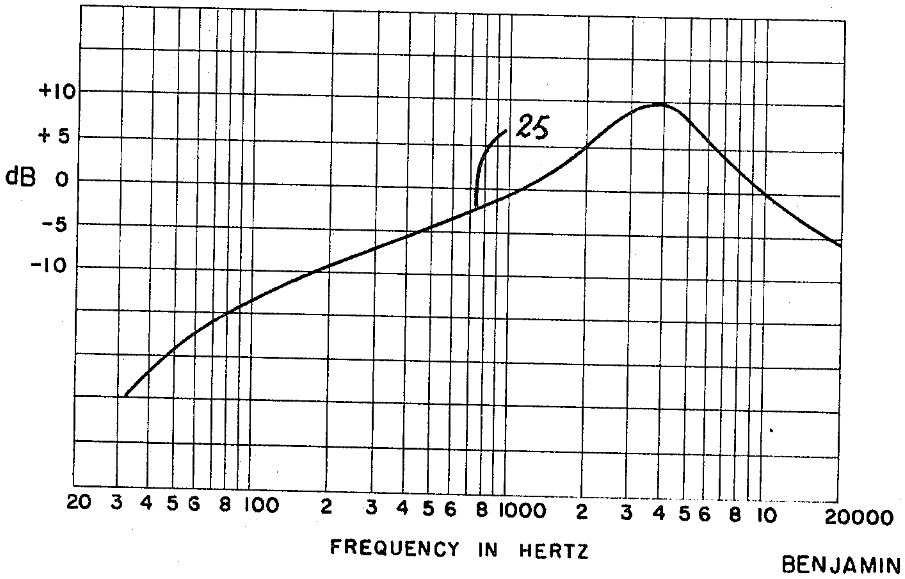

FIG. 3

INVENTORS
BENJAMIN B. BAUER,
EMIL L. TORICK,
RICHARD G. ALLEN &
ALLAN J. ROSENHECK
BY Brumbaugh, Graves, Donohue & Raymond
their ATTORNEYS

AUTOMATIC LOUDNESS CONTROLLER

BACKGROUND OF THE INVENTION

This invention relates to devices for controlling loudness and, more particularly, to a new and improved apparatus for automatically controlling the loudness levels of broadcasting and the like sounds.

In the copending patent application entitled "Loudness Level Indicator", Ser. No. 717,695, filed Apr. 1, 1968, assigned to the assignee of the present invention, a loudness level indicator for accurately monitoring audio loudness levels is described. Generally, the indicator comprises an equalization network to which broadcasting and the like signals are applied, the equalization network having a transfer characteristic which is inversely proportional to a 70 phon equal loudness contour representative of the loudness levels of broadcasting sounds as a function of frequency for sound pressure levels ranging from about 60db. to about 80db.

Further included are eight octave band filters which separate the equalized signals into frequency bands covering the entire audio range. Because of the equalization network, bands of sound of equal loudness are provided as output signals having equal amplitudes. The separated signals are first rectified and linearized and then supplied to a combining network wherein the separated signals are combined linearly. The combined signal is thereafter supplied through a ballistics compensation network to an indicating instrument which provides a visual indication of the amplitude of the combined signal.

The results of tests conducted on the above-described loudness level indicator indicated a substantial correspondence between the loudness level readings provides by the indicator and the loudness levels of sounds as judged by a psychoacoustic test team. The results of these tests are illustrated in the above-identified patent application.

While the above-described loudness level indicator satisfied the long felt need in the broadcasting industry to accurately measure the loudness levels of broadcast sounds, there still exists a need for a device to automatically control the loudness levels of the broadcast sounds. To illustrate, the Federal Communications Commission has recently revised its standards to require that modulation levels be usually not less than 85 percent on peaks of frequent recurrence, but where necessary to avoid objectionable loudness, modulation may be reduced to whatever level is necessary. This standard places the onus on the broadcaster's judgment to determine the relative loudness of program material, which is a less than satisfactory method of controlling loudness. Of course, with the aid of the above-described loudness level indicator, the loudness levels of the program material could be accurately controlled by the broadcaster. This, however, still does not alleviate the need for automatically controlling the loudness levels of the broadcast program material.

SUMMARY OF THE INVENTION

Accordingly, it is an object of the present invention to provide apparatus for automatically controlling the loudness levels of broadcasting and the like sounds.

This and other objects are accomplished by the apparatus of the present invention which automatically controls the loudness levels of sounds. In a particular embodiment of the invention, a unity gain amplifier having a variable gain stage is supplied with signals corresponding to the program material. An analysis of program loudness is made by supplying the amplified signals to an equalizing network which normalizes the signals in accordance with a selected ear sensitivity response characteristic. A plurality of separating networks separate the signals into different frequency bands and the separated signals are first rectified and then combined linearly by a combining network. The combined signals are then compensated by a ballistics compensation network and applied to the variable gain stage of the unity gain amplifier to control the gain of the amplifier and thereby control the loudness level of the program material.

BRIEF DESCRIPTION OF THE DRAWING

In the Drawings:

FIG. 2 is a table illustrating the loudness levels of various broadcasting sounds as indicated by the loudness level indicator described in the above-identified patent application;

FIG. 3 is a graphic representation in logarithmic coordinates of the transfer function of the loudness contour equalizer network of the apparatus of FIG. 1.

DESCRIPTION OF THE PREFERRED EMBODIMENT

Figure 1:
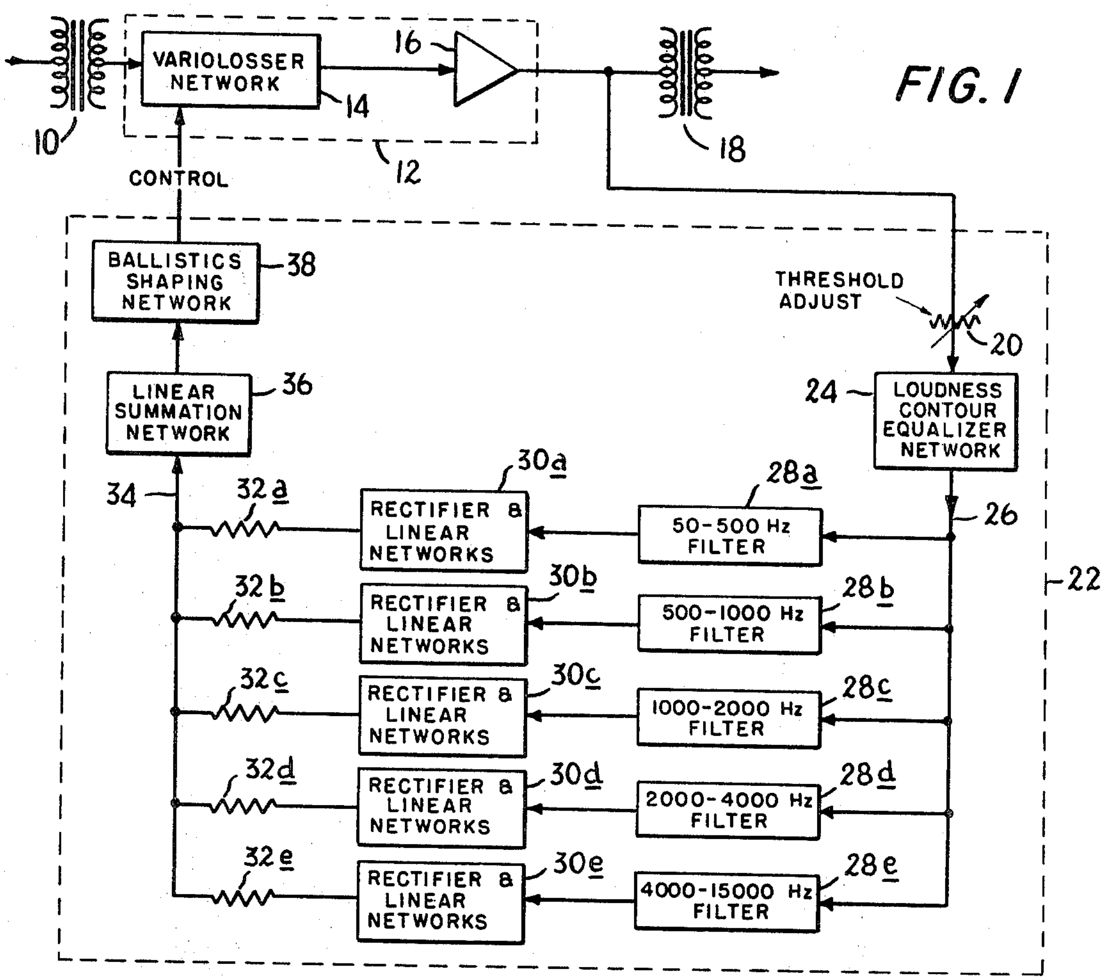
FIG. 1 is a schematic block diagram of an illustrative apparatus for automatically controlling the loudness levels of sounds arranged according to the present invention.

In the illustrative embodiment of apparatus for automatically controlling the loudness levels of sounds arranged according to the invention, as shown in FIG. 1, AC voltage signals corresponding to a broadcast message and supplied, for example, from an automatic modulation peak limiter are applied via a transformer 10 to a unity gain amplifier 12. Inasmuch as the apparatus of the instant invention is intended to be the last variable gain device in the broadcasting system and included immediately following the modulation limiter in the transmitter of the broadcasting system, the instant invention presupposes that the program signals have been thoroughly processed by other automatic variable gain devices in the system and that the electrical levels of the signals are precisely established.

The amplifier 12 includes as a first variable gain stage a variolosser network 14 which may comprise, for example, a light-dependent resistive shunt including a control lamp element. The second stage of the unity amplifier includes an amplifier 16 which may be, for example, a conventional push-pull amplifier. From the unity gain amplifier 12, the signals are supplied to an output transformer 18 which couples the signals to the modulator of the transmitter and to a potentiometer 20 comprising the first component in a loudness gain control or loudness analyzer network 22 and constituting the threshold adjustment control component of the network 22.

The required range of control action by the network 22 loudness determined by the variation of loudness levels expected. With the aid of the above-described loudness level indicator, a study was made of various broadcasting sounds, such as commercials and the like. The table shown in FIG. 2 illustrates certain of the results derived from the measurements, the measurements indicative of the average loudness level readings during 10-second operational segments. An overall average range of 6db., i.e., −3db. to +3db., was observed with occasional peaks above the average maximum. Because of the infrequency of the loudness level peaks above +3db., these peaks did not contribute significantly to the overall impression of loudness in the sampled program material. The required control range was therefore established at 6db.

From the potentiometer 20, the output program signals are supplied to a loudness contour equalizer network 24 which provides a transfer characteristic shown by a solid line 25 in FIG. 3. The transfer characteristic 25 is the inverse of a 70 phon equal loudness contour accurately representative of the loudness levels of broadcasting sounds in the range from about 60 phons to about 80 phons. The loudness contour equalizer network 24 provides the transfer characteristic shown in FIG. 3 in order to normalize the signals in the different frequency bands such that bands of signals corresponding to bands of sound having equal loudness are provided as output voltage signals having equal amplitudes. The 70 phon equalizer circuit illustrated and described in the above-identified patent application is suitable for use as the loudness contour equalizer network 24. Accordingly, the structural details of the network 24 need not be described in detail herein, it sufficing that the network 24 provides a transfer characteristic substantially as shown in FIG. 3.

From the network 24, the equalized signals are supplied through a conductor 26 to the input terminals of five filter circuits 28*a*, 28*b*, 28*c*, 28*d* and 28*e* which separate the normalized signals into frequency bands covering substantially the entire audio range. In particular, the filter circuit 28*a* is responsive to signals having frequencies between 50 and 500 Hz., the filter circuit 28*b* is responsive to signals having frequencies between 500 and 1000 Hz., the filter circuit 28*c* is responsive to signals having frequencies between 1000 and 2000 Hz., the filter circuit 28*d* is responsive to signals having frequencies between 2000 and 4000 Hz. and the filter circuit 28*c* is responsive to signals having frequencies between 4000 and 15000 Hz. By reason of the normalization of the voltage signals provided by the loudness contour equalizer network 24, frequency bands of signals corresponding to bands of sound of equal loudness are provided as separate output signals having equal amplitudes.

In the loudness level indicator described in the above-identified patent application, the signals are divided into eight octave bands. In the instant invention, the full range of eight octave bands is unnecessary for two reasons: (1) the broadcast signals do not normally encompass the total audio range from 20 to 20000 Hz., and (2) inasmuch as there is required a 6db. control range, it is apparent, referring to FIG. 3, that frequencies below 500 Hz. contribute only minimally to the total loudness of a complex signal.

The separated signals are thereupon supplied to a plurality of combined rectifier and linearizing networks 30*a*—30*e*, respectively. As described more fully in the above-identified copending patent application, the accurate addition of the separated signals to provide a combination signal indicative of loudness is dependent upon the linear rectification of the separated signals and, thereafter, the linear addition of the signals. Again, a typical rectifier and linearizing network is illustrated and described in detail in the above-identified copending patent application and, accordingly, the detailed structure of the networks 30*a*—30*e* need not be set forth herein. It suffices that the networks rectify linearly the signals separated by the filters 28*a*—28*e*.

The output terminals of the rectifier and linearizing networks 30*a*—30*e* are connected together through a plurality of resistors 32*a*—32*e*, respectively, by a common conductor 34. Preferably, the resistors 32*a*—32*e* have the same values. The conductor 34 connects the rectified and linearized signals to a linear summation network 36 which adds linearly the separated signals such that the network produces an output voltage signal which is proportional to the sum of the linear voltage signals developed by the rectifier and linearizing networks 30*a*—30*e*. As with the summation network described in the above-identified copending patent application, the network 36 may comprise an operational amplifier. As above stated, the established control range is 6db. Hence, the output of the network 36 is preferably clamped to limit the control signal to a value corresponding to the 6db. limit on gain reduction.

From the linear summation network 36, the sum or control signal is supplied to a ballistics shaping network 38 which, for example, may be of the type illustrated and described in the above-identified copending patent application. The ballistics shaping network 38 is provided to force the overall ballistic characteristic of the apparatus to correspond to experimental determined values for the human ear. As with the loudness level indicator, the circuit parameters of the apparatus are adjusted by the ballistics shaping network 38 to provide an attack time of 100 milliseconds and a decay time of 500 milliseconds. The time-constant compensated control signal is thereafter supplied to the control element of the variolosser 14 in the amplifier 12. When a light resistive shunt is employed as the variolosser or variable gain stage of the amplifier 12, the control signal is supplied to the lamp element of the resistive shunt to control the value of the resistor.

Figure 4:
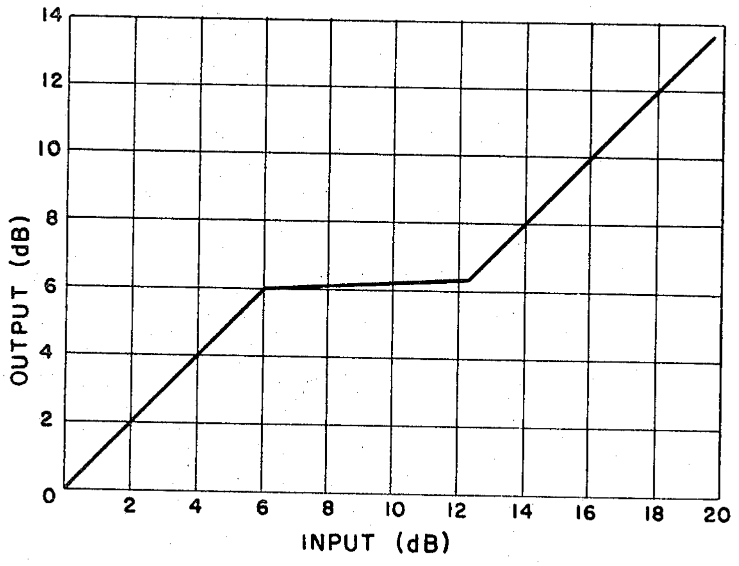
FIG. 4 is a graphic illustration of the response characteristic of the apparatus of the instant invention.

FIG. 4 illustrates graphically the steady-state output (db.) vs. input (db.) response of the apparatus. At low input levels, the apparatus acts as a unity gain amplifier. Above the threshold control, as determined by adjustment of the potentiometer 20, gain reduction occurs but, as above described, the reduction is clamped to a maximum of 6db. Beyond this maximum gain reduction of 6db., the apparatus operates linearly. The 6db. limit on gain reduction prevents possible misuse of the apparatus inasmuch as any gain reduction introduced by the apparatus reduces the maximum modulation of the transmitted program. Also, because linear operation is resumed beyond the 6db. gain reduction maximum, occasional accented sounds can be transmitted with intended effect.

In operation, AC voltage signals corresponding to the broadcast message and supplied from an automatic modulation peak limiter are applied through the transformer 10 to the variable gain stage 14 of the unity gain amplifier 12. The output signals from the amplifier 12 are supplied to the output transformer 18 leading to the transmitter modulator and to the loudness gain control network 22. In the loudness gain control network 22, the output signals are normalized by the loudness contour equalizer network 24 such that bands of signals corresponding to bands of sound of equal loudness are provided as output voltage signals having equal amplitudes.

From the network 24, the normalized signals are separated into five frequency bands covering substantially the entire audio range by the five filter circuits 28*a*—28*e*. Thereafter, the separated signals are rectified and linearized by the networks 30*a*—30*e*, respectively, and supplied to the linear summation network 36. The network 36 adds linearly the separated signals and the linear sum signal produced by the network 36 is supplied through the ballistics shaping network 38 to the control element of the variable gain stage 14 of the unit gain amplifier 12. At low input signal levels, the amplifier 12 acts as a unity gain amplifier and, above the threshold of control, gain reduction occurs but the reduction is clamped to a maximum of 6db.

Although the invention has been described herein with reference to a specific embodiment, many modifications and variations therein will readily occur to those skilled in the art. Accordingly, all such variations and modifications are included within the intended scope of the invention as defined by the following claims.

We claim:

1. Apparatus for automatically controlling the loudness levels of broadcasting sounds comprising amplifier means adapted to amplify linearly signals corresponding to broadcasting sounds and loudness analyzer means responsive to the signals amplified by the amplifier means and adapted to control the gain of the amplifier means in accordance with the loudness levels of the broadcasting sounds, the loudness analyzer means comprising equalizing circuit means having a transfer function inversely proportional to an equal loudness contour over the range of loudness levels of broadcasting sounds represented by said signals, separating means for separating the equalized signals into a predetermined number of frequency bands, a corresponding number of rectifying means for individually rectifying the separated signals and means for arithmetically summing the rectified signals to produce a control signal and for supplying the control signal to the amplifier means to control thereby the gain of the amplifier means.

2. Apparatus according to claim 1 wherein the amplifier means comprises a unity gain amplifier including a variable gain stage responsive to the control signal for controlling the gain of the amplifier.

3. Apparatus according to claim 2 wherein the loudness analyzer means further comprises circuit means interposed between the summing means and the variable gain stage of the unity gain amplifier operative to shape the control signal to conform the response of the apparatus with the response of the human hearing process to impulsive sounds.

4. Apparatus according to claim 3 wherein the rectifying means include means operative to linearize the rectified signals whereby the amplitudes of the output signals from said rectifying means are linearly proportional to the amplitudes of their respective separated signals.

5. Apparatus according to claim 4 wherein the loudness analyzer means further comprises variable threshold adjustment means responsive to the signals amplified by the unity gain amplifier for controlling the operation of the loudness analyzer means and means for limiting the gain reduction over a range corresponding to the average loudness level variations of the broadcasting sounds.

6. Apparatus according to claim 5 wherein the separating means comprises a plurality of filters for dividing the equalized signals into frequency bands of from about 50 to 500 Hz., 500 to 1000 Hz., 1000 to 2000 Hz., 2000 to 4000 Hz., and 4000 to 15000 Hz., respectively.

7. Apparatus according to claim 5 wherein the equalizing circuit means has a transfer function inversely proportional to a 70 phon equal loudness contour representative of the loudness levels of broadcasting sounds as a function of frequency and intensity over a range of pressure levels from about 60db. to about 80db.

8. Apparatus according to claim 5 wherein the loudness analyzer means comprises means for limiting the gain reduction of the unity gain amplifier to a maximum of 6db.